(12) United States Patent
Yacoby et al.

(10) Patent No.: US 7,788,366 B2
(45) Date of Patent: Aug. 31, 2010

(54) CENTRALIZED NETWORK CONTROL

(75) Inventors: Amnon Yacoby, Macabim (IL); Eden Shochat, Raanana (IL)

(73) Assignee: Aternity, Inc, Han Hashron (IL)

( * ) Notice: Subject to any disclaimer, the term of this patent is extended or adjusted under 35 U.S.C. 154(b) by 707 days.

(21) Appl. No.: 10/567,662

(22) PCT Filed: Oct. 6, 2004

(86) PCT No.: PCT/IL2004/000922

§ 371 (c)(1),
(2), (4) Date: Feb. 8, 2006

(87) PCT Pub. No.: WO2005/033829

PCT Pub. Date: Apr. 14, 2005

(65) Prior Publication Data

US 2006/0212556 A1  Sep. 21, 2006

(30) Foreign Application Priority Data

Oct. 8, 2003  (IL)  ................................ 158309

(51) Int. Cl.
*G06F 15/16* (2006.01)
(52) U.S. Cl. ...................... 709/224; 709/223
(58) Field of Classification Search ............... 709/223, 709/224, 225
See application file for complete search history.

(56) References Cited

U.S. PATENT DOCUMENTS

| | | | |
|---|---|---|---|
| 6,336,139 B1 | 1/2002 | Feridun et al. | |
| 6,466,932 B1 | 10/2002 | Dennis et al. | |
| 6,643,614 B2 | 11/2003 | Ding et al. | |
| 6,704,803 B2 | 3/2004 | Wilson et al. | |
| 7,131,037 B1 | 10/2006 | LeFaive et al. | |
| 7,290,048 B1 | 10/2007 | Barnett et al. | |
| 7,490,073 B1 | 2/2009 | Qureshi et al. | |
| 2003/0084329 A1 | 5/2003 | Tarquini | |
| 2004/0010718 A1 | 1/2004 | Porras et al. | |
| 2004/0034795 A1 | 2/2004 | Andrson et al. | |
| 2004/0049566 A1* | 3/2004 | Mattila et al. | ............... 709/223 |
| 2004/0093513 A1 | 5/2004 | Cantrell et al. | |
| 2005/0038818 A1 | 2/2005 | Hooks | |
| 2006/0092861 A1 | 5/2006 | Corday et al. | |

OTHER PUBLICATIONS e-Security. Partner Sales Guide. Rockledge, FL. Winter 2002.*

* cited by examiner

*Primary Examiner*—William C Vaughn, Jr.
*Assistant Examiner*—Scott Christensen
(74) *Attorney, Agent, or Firm*—Richard I. Samuel

(57) ABSTRACT

A method of network control. The method includes collecting real-time operation information on one or more first network elements of a network, selecting a policy to be implemented by at least one second network element, different from the first network element, responsive to the collected real time information from the one or more first network elements, the at least one second element including an end-point element of the network and enforcing the selected policy on an agent hosted by the at least one second network element.

25 Claims, 4 Drawing Sheets

CENTRALIZED NETWORK CONTROL

CROSS REFERENCE TO RELATED APPLICATION

This is a national phase filing of International Application No. PCT/IL2004/000922, which was filed on Oct. 6, 2004 and published in English on Apr. 14, 2005, and claims priority of Israel Patent Application No. 158309 filed on Oct. 8, 2003.

FIELD OF THE INVENTION

The present invention relates to computer networks and particularly to computer networks having one or more of end-point monitoring, problem identification and policy enforcement.

BACKGROUND OF THE INVENTION

Computer networks are a major work tool in many enterprises and in other organizations. Generally, each user is assigned a computer and a network connects the computers of all the users. The computers may all be located at a same locality and/or may be connected through wide area networks, such as the Internet. The network is used, for example, to exchange data, to access peripherals (e.g., servers, printers) and/or to access databases.

It is important to control and support the operation of the computers of the organization in order to allow efficient utilization of the computers.

U.S. patent publication 2003/0069972 to Yoshimura et al., the disclosure of which is incorporated herein by reference, describes a network in which virtual local area network (VLAN) definitions are changed dynamically, according to the available bandwidth of the links of the network.

U.S. Pat. No. 6,393,474 to Eichert et al., the disclosure of which is incorporated herein by reference, describes a dynamic policy management system for controlling policy definitions of active devices (e.g., switches, routers) of a network.

U.S. Pat. No. 6,671,724 to Pandya et al., the disclosure of which is incorporated herein by reference, describes a system for managing a distributed network in which agent modules interact with a control module.

U.S. Pat. No. 6,256,741 to Stubblebine, the disclosure of which is incorporated herein by reference, describes a method of specifying security protocols and policy constraints in distributed systems.

US patent publication 2002/0013807 to Richard, the disclosure of which is incorporated herein by reference, describes a process for control and management of an intranet network. An agent is installed on the computers of the network and the agent is used for software installation tasks on the computer.

U.S. patent publication 2002/0019864 to Mayer, the disclosure of which is incorporated herein by reference, describes an IT network comprising distributed managers and agents arranged hierarchally.

PCT publication WO 2004/051437 to Farmer, the disclosure of which is incorporated herein by reference, describes a system for providing an enterprise-based security policy to agents on computers of the network.

The systems described in the above patents aid in the control of defining policies and controlling their enforcement. Still, the task of defining the policies is very time consuming and therefore, in most cases, only very simple policies are instituted and enforced.

U.S. patent publications 2002/0198961 and 2003/0046343 to Krishnamurthy et al., the disclosures of which are incorporated herein by reference, describes a server that clusters the clients that approach the server according to the quality of their connection and accordingly takes actions to accommodate the clients.

U.S. Pat. No. 6,694,314 to Sullivan et al., the disclosure of which is incorporated herein by reference, describes an automated technical support system, which scans a user's computer and provides suggestions for repair and even performs the repair.

U.S. Pat. No. 6,654,914 to Kaffine et al., the disclosure of which is incorporated herein by reference, describes techniques for determining causes of faults on used computers, through a network connection.

Not all problems are identified by the systems of these last two patents. Usually these systems identify only problems that are already known from previous human analysis over other computer networks.

SUMMARY OF THE INVENTION

An aspect of some embodiments of the present invention relates to a policy enforcement system, which enforces policies on end-points (e.g., computers) of a network based on real time network attribute values from one or more other network elements (e.g., routers, switches, end-points).

In some embodiments of the invention, the policy enforcement is directed at identifying problems of network elements and solving the problems and/or preventing the problems from affecting other network elements. In an exemplary embodiment of the invention, upon a determination that computers running concurrently a specific version of a word-processor and a proprietary application suffer from frequent crashes, other computers are instructed not to install the specific version of the word-processor.

In other embodiments of the invention, the policy enforcement is directed at resource allocation based on real time network information. For example, allocation of resources (e.g., server access time) may depend on a real time determination of the needs of the computers of a network, based on real time information. For example, if there is a determination that a relatively large percentage of network computers are remotely connected to the network, the system control may decrease the resources allocated to the remotely connected computers and/or to the other computers of the network.

In some embodiments of the invention, the selection of a policy to be enforced is performed automatically by a network policy controller. Alternatively, the selection of the policy to be enforced is performed by a human system manager.

Optionally, policy enforcement agents are run on each of the network elements being policed. The agents optionally collect information to be transmitted to the policy controller and perform the enforcement based on instructions from the policy controller.

In some cases, an enforced policy is selected based on attribute values collected from at least 5, 10, 20 or even more network elements.

An aspect of some embodiments of the present invention relates to a network management system which collects values of attributes from elements of the network (e.g., endpoints, switches) and clusters the elements into groups according to attribute values of the elements. The attribute values are optionally collected in real time, such that the clustering is performed, or at least initiated, within less than an hour, or even less than 5-10 minutes from the reception of the attribute values.

In some embodiments of the invention, each network element hosts an agent which collects the attribute values and provides the collected values to a data aggregator. The data aggregator determines and forms groups of network elements that have common values for a plurality of different attributes.

The groups of elements optionally include elements that have one or more attribute values that are indicative of operations problems and one or more cause attributes that may be the cause of the operation problem. The results of the grouping may be used to automatically determine solutions to the problem and/or to provide a system manager with information useful in identifying the problem and finding a solution.

An aspect of some embodiments of the present invention relates to a method of analyzing problems in a network. The method includes collecting values of a plurality of attributes for a plurality of end-point computers having a problem and determining possible causes of the problem based on the values of the attributes. In some embodiments of the invention, the determination of possible causes is also based on values collected from computers not having the problem. Alternatively or additionally, the determination of possible causes is also based on old records of problems that existed but were solved.

In some embodiments of the invention, the collected values are scanned for correlations between the values of different attributes. Alternatively or additionally, the collected values are analyzed using a neural network.

In some embodiments of the invention, the collected values include "snapshot" records of end-points at previous times, i.e., each of the records includes end-point attributes at a given time or over a short period. The use of such "snapshot" records from earlier points in time aids in identifying problem causes, especially when there are snapshot records of a same end-point having a problem and not having the problem.

An aspect of some embodiments of the present invention relates to controlling access permission and/or priority to network servers, based on adaptive network parameters. The adaptive network parameters optionally include the location, the connection quality and/or the load of a network element requesting the access. Adapting the access control according to the user's resources prevents assigning resources to elements that cannot use the assigned resources and/or to elements that will slow down the operation of the servers.

An aspect of some embodiments of the present invention relates to controlling access permission to network resources, based on adaptive network parameters. The network resources optionally include network servers and/or routers.

An aspect of some embodiments of the present invention relates to a policy enforcement agent installed on an end-point computer of a network that is adapted to update the policies it enforces dynamically while being run on the end-point computer. The agent optionally deals with policy enforcement of an open group of problems, such as operation problems, which does not allow pre-configuration of the agent with all the policy actions that it may be required to employ.

In some embodiments of the invention, the agent is adapted to operate on its own without being connected to a policy controller. For example, an agent installed on a laptop is optionally configured to enforce policies even when the laptop is not connected to the network. When the laptop is connected to the network it optionally receives instructions on the policies it is to enforce, and when the laptop is not connected to the network it enforces or continues to enforce the policies. For example, even when an end-point is not connected to the network, a policy preventing installation of specific software applications is enforced. The agent is optionally adapted to enforce policies under immediate instructions from a policy controller.

In some embodiments of the invention, the policies enforced by an end-point depend on the location of the end-point and/or on other attributes, such as whether it is connected to the network. For example, when the end-point is not connected to the network, the agent optionally prevents any software installations, while when connected to a policy controller certain software applications are allowed to be installed, following verification with the policy controller that the software applications are allowed for installation. In another example, the laptop may be prevented from connecting to the Internet or to certain sites, except via the network.

Alternatively or additionally, the agent enforces specific acts upon a change in one or more attributes, such as the location of the network. Optionally, each time the end-point is connected to the policy controller, the agent of the end-point communicates with the policy controller and/or aggregator to review offline activity, e.g., to determine that applications that should not be installed were not installed while the end-point was not connected to the network.

An aspect of some embodiments of the invention relates to a method of communicating between network elements. Each network element is preconfigured with a plurality of pieces of identification data, e.g., encryption keys and/or functions, which are stored also by a policy controller. The pieces of identification data are optionally used for verifying the identity of the network element before the policy controller and/or for encrypting network information transmitted between elements of the network.

In identity verification, the policy controller instructs the network element whose identity is being verified to perform a calculation on one or more, but less than all, of the prestored pieces of identification data and transmit the result to the controller.

In transmitting network information between entities, one or more, but less than all, of the pre-stored pieces of identification data are used in encrypting the information. The receiver of the network information is notified which pieces of the prestored identification data were used in encrypting the network information in the message carrying the encrypted information or in a separate message.

In some embodiments of the invention, the prestored pieces of identification data are used for encrypting information transmitted to and from the policy controller. When information is transmitted from the policy controller, the controller encrypts the information using one or more of the pieces of data stored by the destination network element. The encrypted information is then transmitted to the destination with indication of the identification data pieces to be used in the decryption. In some embodiments of the invention, the encryption additionally uses other keys, for example in accordance with a public-private key.

When information is transmitted from the network element to the policy controller, the message from the controller instructs the network element which pieces of the identification data to use in the encryption. The transmitted information includes, for example, the status data of the network element.

In some embodiments of the invention, the prestored identification data is used to transmit information between two network elements. The policy controller instructs the transmitting network element as to which prestored data pieces to use in the encryption of the information and instructs the receiving element on the data pieces to be used in decrypting the information. Alternatively or additionally, some or all of the network elements perform the tasks described above as performed by the policy controller, i.e., selecting the prestored data pieces to be used in the encryption and notifying the destination network element which data pieces are to be used in the decryption or encryption.

Optionally, the prestored pieces of identification data are not transmitted over the network and are only used for calculating the transmitted result, such that the prestored pieces of identification data are kept secret. Using prestored pieces of identification data allows performing simple identity verification procedures and also allows encrypting transmitted network information without requiring agreeing on the key to be used, in a secure manner.

The term network element refers in the present application to any entity belonging to a network including end-points (e.g., work stations, personal computers) and network devices (e.g., routers, switches, printers).

In some embodiments of the invention, the data transmission is performed for identity verification purposes and the correct calculation result is known to the policy controller. The message from the policy controller instructs the network element which identification data pieces to use in the calculation and optionally also provides additional data pieces to be used in the calculation. Optionally, the identity verification is performed for each single network element separately, for example in a sequential manner. Alternatively or additionally, the identity verification may be performed by transmitting a broadcast or multicast transmission and having all receiving elements responding in accordance with the preconfigured pieces of data. Such a multicast transmission may be used to manage an inventory of the elements of the network. Computers not preconfigured with the data pieces will not be able to verify their identity with the controller and therefore will not be able to receive service from the network.

In other embodiments of the invention, the transmitted network information encrypted by one or more pieces of the identification data includes information required for control of the network, such as status information of the network element. Alternatively or additionally, the transmitted information includes commands that control the operation of the network, such as access allowance commands transmitted to network devices (e.g., printers, routers, databases) and/or to network elements of the network.

Optionally, the pieces of identification data include codes belonging to a list of codes prestored in network elements. Optionally, in order not to expose the entire list of codes, only one or two codes are used in each communication between the controller and a network element. In some embodiments of the invention, the codes are never transmitted on the network, but rather are used to encode information being transferred and/or are encrypted by a function. Alternatively or additionally to the pieces of identification data including codes, the pieces of identification data include functions that are to be applied to transferred data and/or to one or more codes. In some embodiments of the invention, less than 10%, 5% or even 2% of the prestored pieces of identification data are used in a single transfer of information and/or in a single identity verification.

In some embodiments of the invention, all the valid network elements are preconfigured with a same set of pieces of identification data. Using the same set of prestored pieces of identification data simplifies secured transmission between network elements not passing through a policy controller and/or simplifies the operation of the policy controller. Alternatively, different network elements are preconfigured with different pieces of data, for example with different sets of functions. Optionally, at least some encryption calculations involve using both one or more identification data pieces unique to the network element and one or more identification data pieces common to all the valid network elements.

An aspect of some embodiments of the present invention relates to a method of controlling network devices, in which a controller transmits to a network element and to a network device, which the element needs to access, an authentication key that they are to use in communicating with each other. Providing the authentication key to the network device by the controller allows continuous changing of the required authentication key, such that getting hold of an old key does not enable access to the network device.

In some embodiments of the invention, when a network element needs to access a network device, the network element transmits a message to the policy controller requesting access permission to the device. The policy controller optionally verifies the authenticity of the requesting network element, using any method known in the art and/or as described herein, and provides the network element with a current key of the network device. In some embodiments of the invention, responsive to the request, the controller provides the key to the network device. Alternatively or additionally, the network device is authenticated responsive to the request.

There is therefore provided in accordance with an exemplary embodiment of the invention, a method of network control, comprising collecting real-time operation information on one or more first network elements of a network, selecting a policy to be implemented by at least one second network element, different from the first network element, responsive to the collected real time information from the one or more first network elements, the at least one second element including an end-point element of the network and enforcing the selected policy on an agent hosted by the at least one second network element.

Optionally, collecting real-time operation information comprises collecting information on operation problems, on applications that do not operate or operate slowly, on system or application crashes, on software applications installed or running on the network elements and/or on the communications between elements of the network.

Optionally, selecting the policy to be implemented comprises selecting a policy relating to a software to be installed on the second network element and/or to be uninstalled from the second network element. Optionally, selecting the policy to be implemented comprises selecting a policy relating to preventing installation of a software on the second network element. Optionally, selecting the policy to be implemented comprises selecting responsive to a determination that a group of network elements having a common problem have installed thereon a specific software application or combination of software applications.

Optionally, selecting the policy to be implemented comprises selecting a policy relating to allocation of network resources. Optionally, the policy is selected within less than 60 minutes from the collecting of the information. Optionally, collecting the operation information is performed repeatedly.

There is further provided in accordance with an exemplary embodiment of the invention, a policy controller, comprising an input interface, an output interface and a processor adapted to receive through the input interface real-time operation information on one or more first network elements of a network, to select a policy to be implemented by at least one second network element, different from the first network element, responsive to the collected real time information from the one or more first network elements, the at least one second element including an end-point element of the network and to transmit instructions on the selected policy to be enforced to an agent hosted by the at least one second network element, through the output interface.

Optionally, the processor is adapted to select the policy to be implemented by the at least one second network element responsive to operation information collected from at least 2 or even at least 10 first network elements.

There is further provided in accordance with an exemplary embodiment of the invention, a network management system, comprising an input interface, an output interface; and a processor adapted to collect attribute values from a plurality of network elements of a network through the input interface, to find groups of network elements having similar attribute values for a plurality of attributes and to transmit a policy selected responsive to the groups, through the output interface.

Optionally, the processor is adapted to find, for a group of network elements having a problem, a combination of attribute values that correlate with the problem to at least a predetermined degree. Optionally, the processor is adapted to find, for a group of network elements having a problem, a combination of attribute values that appears only on the network elements having the problem.

Optionally, the processor is adapted to collect for at least one network element, a plurality of snapshot records of the network element at different times. Optionally, the processor is adapted to verify that each network element belongs to the network before collecting information from the network element. Optionally, the processor is adapted to find groups using a k-clustering or hierarchy clustering method.

There is further provided in accordance with an exemplary embodiment of the invention, a method of network control, comprising collecting attribute values from a plurality of computers having a problem, collecting attribute values from a plurality of computers not having the problem and determining attribute values associated with the problem, responsive to the collected attribute values.

Optionally, determining the attribute values comprises determining using a neural network and/or using k-clustering or hierarchy clustering.

There is further provided in accordance with an exemplary embodiment of the invention, a method of communicating within a network, comprising configuring a network element with a plurality of pieces of identification data, unique to the network to which the network element belongs, transmitting from a policy controller to the network element an instruction to perform a calculation using at least one piece, but not all, of the configured pieces of identification data, and performing the instructed calculation by the network element responsive to the instruction.

Optionally, substantially all the network elements of the network are configured with the same plurality of pieces of identification data. Optionally, different of the network elements of the network are configured with different sets of plurality of pieces of identification data. Optionally, the plurality of pieces of identification data comprise a plurality of codes. Optionally, the plurality of codes have a sequential order and the instruction identifies the codes by a number identifying their order in the sequence.

Optionally, the plurality of pieces of identification data comprise a plurality of functions. Optionally, transmitting the instruction comprises transmitting an instruction to use less than 5% of the configured pieces of identification data. Optionally, transmitting the instruction comprises transmitting an instruction to use a single piece of the configured pieces of identification data. Optionally, transmitting the instruction comprises transmitting an instruction to use in the calculation a single code and a single function of the configured pieces of identification data. Optionally, the method includes transmitting a result of the calculation to the policy controller. Optionally, the method includes verifying by the controller that the transmitted result of the calculation is equal to a predetermined value indicative that the network element is part of a network controlled by the controller.

Optionally, the method includes performing by the controller a reverse calculation on the transmitted result of the calculation so as to extract information transmitted from the network element to the controller. Optionally, the extracted transmitted information comprises information on the status of the network element. Optionally, a result of the calculation includes information transferred from the controller to the network element. Optionally, the information transferred from the controller to the network element comprises an instruction on access permissions to be given by the network element.

Optionally, the information transferred from the controller to the network element comprises a code to be given by a different network element accessing the network element receiving the transferred information. Optionally, transmitting the instruction from the policy controller comprises transmitting a unicast packet. Optionally, transmitting the instruction from the policy controller comprises transmitting a multicast packet. Optionally, the multicast packet requires that all the elements of the network perform a same calculation.

There is further provided in accordance with an exemplary embodiment of the invention, a method of controlling resource access within a network, comprising transmitting by a network element a request to use a resource of a network device, transmitting, by a controller to the network device, a message indicating a code required from the network element in order to access the network device and allowing the network element to use the resource if the required code is received from the network element.

Optionally, transmitting the request comprises transmitting from the network element to the network device and forwarding from the network device to the controller. Optionally, transmitting the request comprises transmitting from the network element directly to the controller. Optionally, transmitting the message indicating the code comprises transmitting a message indicating a calculation to be performed on data configured in the network device in order to extract the code. Optionally, the method includes transmitting a message indicating the required code from the controller to the network element. Optionally, the messages to the network device and to the network element indicate substantially identical calculations to be performed in order to determine the code. Optionally, the messages to the network device and to the network element indicate different calculations to be performed in order to determine the code.

There is further provided in accordance with an exemplary embodiment of the invention, a method of controlling resource access within a network, comprising determining a network condition of a network element and assigning the network element an access priority to be provided by a network server, at least partially based on the determined network condition. Optionally, the network condition comprises a location of the network element.

Optionally, the network condition comprises a bandwidth or quality of a connection of the network element to the network.

There is further provided in accordance with an exemplary embodiment of the invention, a method of controlling resource access within a network, comprising determining a network condition of a network element and assigning the network element an access permission to a network device, at least partially based on the determined network condition.

BRIEF DESCRIPTION OF THE DRAWINGS

Exemplary non-limiting embodiments of the invention will be described with reference to the following description of the embodiments, in conjunction with the figures. Identical structures, elements or parts which appear in more than one figure are preferably labeled with a same or similar number in all the figures in which they appear, and in which.

DETAILED DESCRIPTION OF EXEMPLARY EMBODIMENTS

Figure 1:
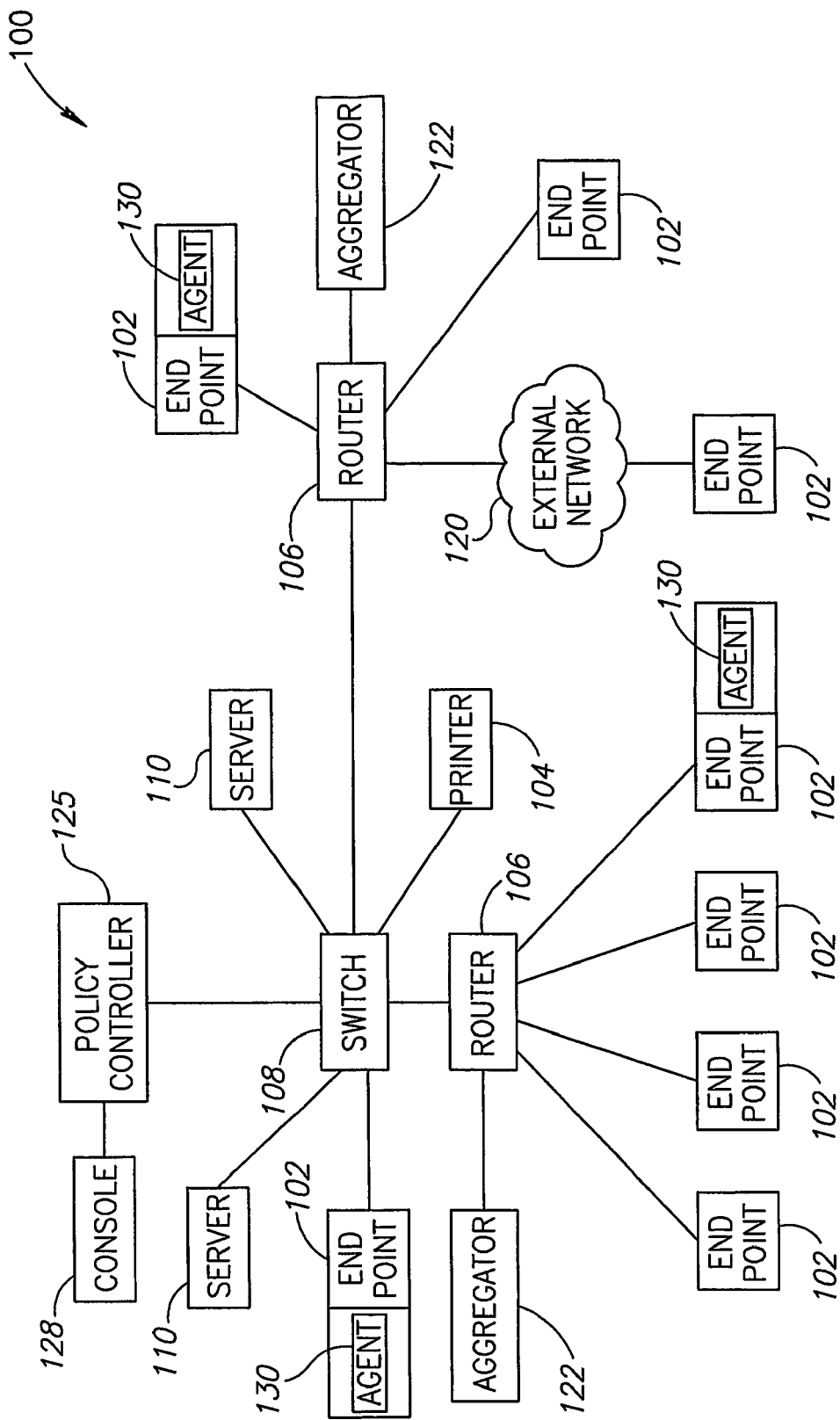
FIG. 1 is a schematic illustration of a computer network, in accordance with an exemplary embodiment of the present invention.

FIG. 1 is a schematic illustration of a computer network 100, in accordance with an exemplary embodiment of the present invention. Network 100 optionally includes a plurality of end-points 102 connected through routers 106 and/or switches 108. Some end-points 102 may be connected to network 100 through an external network 120, such as the Internet. End-points 102 may be connected to the network through wire links (e.g., dial up connections, Ethernet cables) or through wireless links. The end-points 102 may connect to the network from the same point at all times, or may connect from different points at different times. For example, some or all of end-points 102 may include laptops or PDAs that connect from home using a dialup or ADSL connection and at the office through a local area network (LAN) connection.

The term end-point refers herein to any processing machines that interact with users, such as computers, cellular telephones, interactive TVs and PDAs.

Network 100 optionally further comprises network devices, such as a printer 104 and servers 110 that provide services to end-points 102. Servers 110 may include, for example, access application servers, such as ERP and CRM servers, database servers, outlook exchange servers and any other types of servers known in the art. Although not shown, network 100 may include substantially any other additional devices or apparatus known in the art, such as load balancers, network node managers and help desk systems.

The term network device refers in the present application to any device belonging to the network that is not an end-point, i.e., a device that services other network elements. The network devices include, for example, printers 104, switches 108, routers 106 and servers 110. The term network element refers in the present application to any entity belonging to the network including end-points 102 and network devices.

In some embodiments of the invention, each end-point 102 hosts an agent 130 (shown only on some of end-points 102 for clarity of FIG. 1). Agent 130 optionally collects information from the end-point 102 on which it is hosted and provides the information to a policy controller 125. In some embodiments of the invention, agent 130 also receives policy instructions from policy controller 125 and carries out the instructions. Agent 130 is optionally a software process that uses the standard hardware of end-points 102. Alternatively, agent 130 includes a combination of software and hardware, for example using a plug for encrypted or verified communication with controller 125.

Policy controller 125 optionally determines common attribute values of groups of end-points 102 and accordingly generates instructions to agents 130. In some embodiments of the invention, the instructions are intended to solve operational problems and/or to avoid problems from occurring. Alternatively or additionally, the instructions are directed at allocation of network resources, such as priorities in accessing printer 104 and/or other network devices. Further alternatively or additionally, the instructions relate to access control in the network. In some embodiments of the invention, policy controller 125 transmits resource allocation and/or access instructions directly to the network devices.

In small networks 100, controller 125 optionally communicates directly with agents 130. In larger networks, one or more aggregators 122 are used to collect information from agents 130 and to perform initial processing tasks. Alternatively or additionally, the aggregators 122 generate and/or provide policy instructions to agents 130. Optionally, controller 125 does not contact agents 130 directly but rather only through aggregators 122. Instructions generated by policy controller 125 are transmitted, in some embodiments of the invention, through the aggregator 122 servicing the agent 130. Further alternatively or additionally, controller 125 serves as an aggregator for a group of agents 130.

A console 128 is optionally used to allow a system manager to interact with controller 125. Agents 130, aggregators 122, controller 125 and console 128 are referred to together as a network control system.

Figure 2:
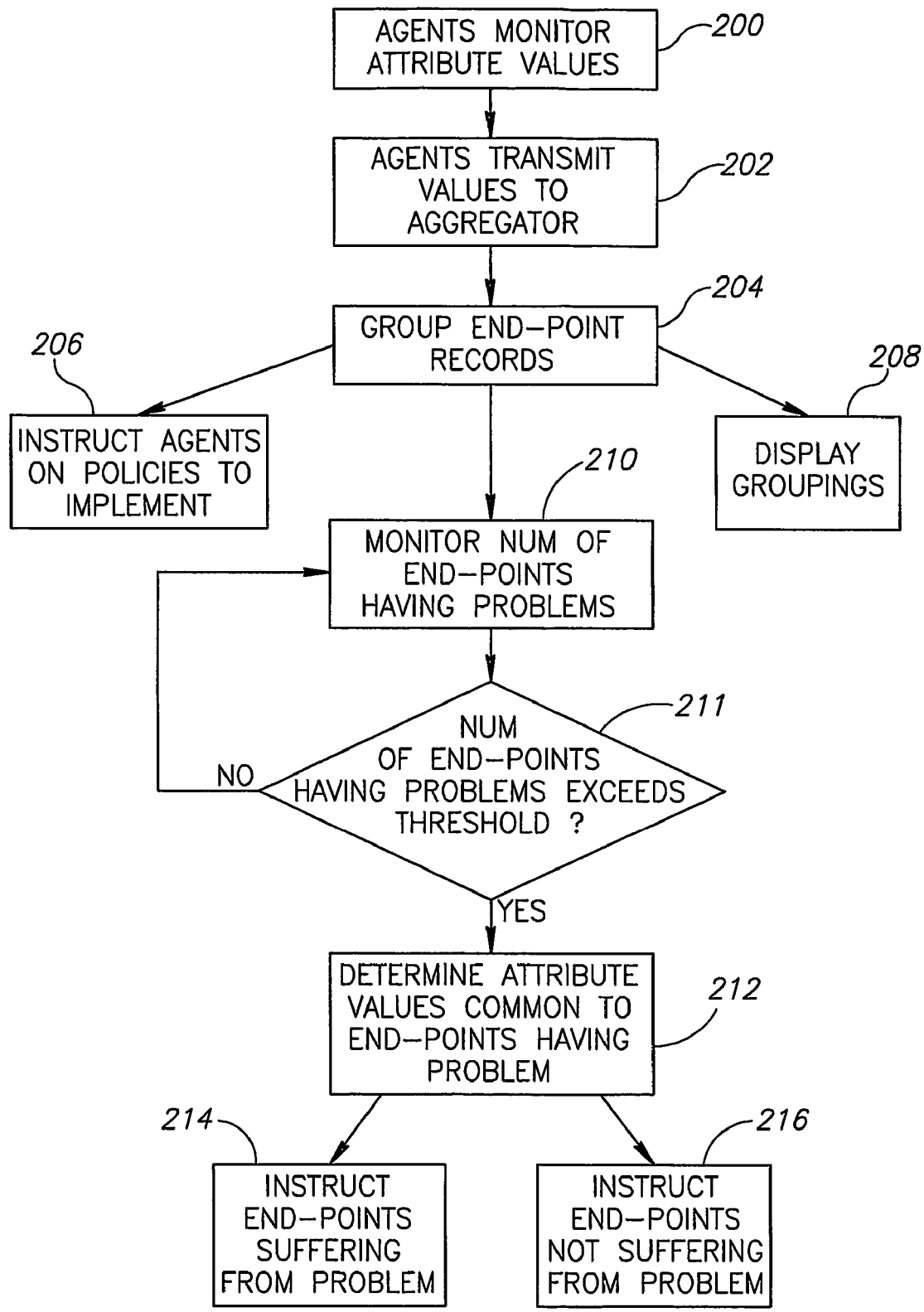
FIG. 2 is a flowchart of acts performed by a network control system, in accordance with an exemplary embodiment of the invention.

FIG. 2 is a flowchart of acts performed by a network control system, in accordance with an exemplary embodiment of the invention. Agents 130 monitor (200) the values of a set of attributes of the end-points 102 on which they are hosted. The set of attributes being monitored is optionally determined according to instructions from policy controller 125. The collected attribute values (e.g., IP address, applications used, number of rebootings or application crashes, connections to the network and the Internet, etc.) are optionally transmitted (202) to an aggregator 122, with which it is associated. Aggregator 122 optionally groups (204) together end-points 102 having common or similar attribute values. The grouping results are optionally transferred to controller 125, which combines the grouping results from all of aggregators 122. In some embodiments of the invention, responsive to the results of the grouping, controller 125 instructs (206) agents 130 on the policies they are to implement. Alternatively or additionally, group controller 125 displays (208) the groupings on console 128 and allows a system manager to configure policies of one or more groups of end-points together.

The monitored attributes optionally include at least some attributes which indicate operation problems. Some other attributes that are not indicative of problems are referred to herein as cause attributes (as they may be the cause of a problem).

Aggregators 122 and/or controller 125 optionally monitor (210) the number of end-points having an attribute value indicative of a problem. When the number of end-points 102 having a specific problem exceeds (211) a predetermined threshold, controller 125 attempts to determine (212) significant cause attribute values common to the end-points 102 suffering from the problem. According to the determined common attribute values, controller 125 instructs (214) end-points 102 suffering from the problem on policies they are to carry out. Alternatively or additionally, controller 125 instructs (216) end-points 102 not suffering from the problem on acts they are to perform in order to continue avoiding suffering from the problem.

Referring in more detail to monitoring (200) the attributes of end-points 102, in some embodiments of the invention the monitored attributes include attributes on the connection of the end-point 102 to the network, such as the type of connection of the end-point 102 to the network (e.g., VPN, ADSL, dial up, Ethernet, cellular, wireless), the connection speed and/or the utilization of the connection capacity. For example, the monitored attributes may include the incoming and/or outgoing packet counts. Alternatively or additionally, the monitored attributes include the sub-net of the IP address of the end-point 102 and/or a sub-field of the MAC address of the end-point. The MAC address may be used, for example, to identify the producer of end-point 102, as is known in the art. In some embodiments of the invention, the monitored attributes include a list of the elements neighboring the network element.

The monitored attributes optionally include information on the configuration of the end-point 102, such as the hardware of the end-point 102. The monitored configuration optionally includes the software applications and operating system running on the end-point 102 including their versions and any software patches installed thereon. In some embodiments of the invention, the monitored attributes include data on the load of end-point 102 (e.g., the average load), the memory utilization of end-point 102 and/or any other operation statistics. For example, the monitored attributes may include a file size distribution profile (e.g., the number of files larger than and/or smaller than predetermined thresholds) and/or the number of files having extraordinary names. In some embodiments of the invention, the monitored attributes include the speed of access to applications and/or the response time of applications.

In some embodiments of the invention, the monitored attributes include attributes indicative of problems in the operation of end-point 102, such as the number and frequency of reboots of end-point 102 and/or indication of applications that cannot run or run with errors. Alternatively or additionally, the monitored attributes include attributes indicating very slow operation of applications, memory overflow and/or communication problems. In some embodiments of the invention, one or more attributes are indicative of lack of resources. For example, slow operation of an application may be indicative of lack of memory or of communication bandwidth.

The monitored attributes optionally also include the usage patterns of end-points 102, such as the applications generally used together, the percentage of time each application is used on the average and/or the locations at which the end-point 102 is used.

In some embodiments of the invention, the monitored attributes include application specific attributes, such as a number of transactions performed using a specific application (e.g., a bank teller application) or an average size of files generated using a word processing software.

Aggregators 122 and/or policy controller 125 optionally also keep track of relatively static (e.g., user configured) information on end-points 102, such as the department to which they belong and/or the status of the user of the end-point 102 (e.g., manager, new employee, contractor, guest).

Some or all of the monitored (200) attributes are optionally pre-configured in agents 130. Alternatively or additionally, agent 130 receives instructions from policy controller 125 on the attributes to be monitored and/or on the attributes whose values are to be reported to aggregator 122. For example, in a normal state, a limited set of attribute values are collected; when a problem is identified a larger set of attribute values are monitored.

In some embodiments of the invention, the monitoring includes generating periodic snapshot records of the status of the end-point computers of the network. The generation of the snapshots provides a larger amount of data which can be analyzed to determine correlations between problems and cause attribute values. For example, data from a computer that suffered from a problem for a few days and then the problem disappeared (due to technician handling or random acts) can be used in solving problems of other computers.

Aggregators 122 optionally review the snapshot records and delete similar records that do not add substantial information. Particular attention is optionally given to end-points 102 in which problems appeared or disappeared. Snapshot records of the end-points 102 from before and after the problem disappeared, are optionally stored with high detail levels, while other snapshot records are compressed and stored with low detail levels. Alternatively or additionally, the record snapshots from some or all of the end-points 102 are analyzed in order to generate metadata of important groups of attributes. The metadata is stored in addition to, or instead of, the snapshot records. In some embodiments of the invention, the record snapshots are analyzed close to the time of their collection in order to generate the metadata on their groupings. The metadata allows faster analysis at later stages when a problem or other need of analysis arises. Optionally, in order to conserve storage space, only the metadata is stored. The stored metadata may be used at a later stage for analysis of a problem identified at such later stage.

Referring in more detail to transmitting (202) the attributes to aggregator 122, in some embodiments of the invention, whenever an end-point 102 is operated and/or is connected to network 100, the agent 130 on the end-point 102 forms contact with aggregator 122 and provides the aggregator with information on the end-point. Alternatively or additionally, whenever agent 130 determines a change in its operation and/or configuration, it transmits information on the change to aggregator 122. Further alternatively or additionally, agents 130 are configured to periodically transmit information to aggregator 122.

Alternatively or additionally to aggregator 122 passively receiving the information, in some embodiments of the invention, aggregator 122 manages a list of end-points belonging to network 100 and periodically queries each of the end-points to determine whether it is currently operative and connected to the network and to receive information. Alternatively or additionally, aggregator 122 periodically transmits broadcast messages throughout the network, requesting some or all of end-points 102 to provide information. Further alternatively or additionally, whenever an agent 130 contacts aggregator 122, the aggregator queries the agent for information that it did not provide at its own initiative. For example, agents 130 may be configured only to report their existence, and to provide information only in response to queries from aggregator 122.

In some embodiments of the invention, aggregator 122 collects different amounts of data from different end-points 102. For example, a basic set of attributes is collected from all end-points 102, while a larger set of attributes is collected from a smaller group of end-points, for example a randomly selected set of end-points 102 and/or end-points 102 that have problems.

Aggregator 122 may optionally instruct agents 130 on the times at which they are to provide information to aggregator 122. In some embodiments of the invention, agents 130 are instructed to provide information periodically, for example every 3-6 hours or every day and/or each time at least a predetermined amount of data was collected (e.g., at least 1 Mbyte). Alternatively or additionally, agents 130 are instructed to provide information to aggregator. 122 whenever there is a change in the data or a change in at least a predetermined number (e.g., 10-20) attribute values. In some embodiments of the invention, agents 130 may be instructed using functions which depend on various attributes, such as the usage patterns of the end-point 102.

The grouping (204) of end-points 102 is optionally performed in order to simplify and speed up the finding of attribute values which may be the cause of a problem, when a problem is detected. For example, the grouping (204) may result in a determination that end-points 102 that use the same gateway, firewall or load balancer generally belong to the same IP sub-net. When a problem is identified, the end-points 102 having the problem are optionally checked as to whether they belong to the same IP sub-net. If they do not belong to the same sub-net, there is no need to check whether they use the same gateway, firewall or load balancer and these are probably not the cause of the problem. Thus, determining (212) the significant cause attribute values common to the end-points 102 having the problem is optimized and performed faster.

Referring in more detail to grouping (204) together end-points 102 having common or similar attribute values, in some embodiments of the invention the grouping is performed using grouping methods known in the art, such as k-clustering and/or hierarchical clustering, which are described, for example in http://genome.imim.es/~eblanco/seminars/docs/clustering/index_types.html, available on Oct. 4, 2004, the disclosure of which is incorporated herein by reference. Optionally, the grouping is performed using known database (SQL) grouping methods.

In some embodiments of the invention, the grouping includes defining a group for each possible value, or group of similar values, for each monitored attribute. Controller 125 then searches for groups that include the same members as other groups and can therefore be combined and/or groups that are included in other groups. In some embodiments of the invention, the grouping also includes finding groups that have a large overlap or are otherwise closely related.

The grouping optionally includes finding correlations between the values of different attributes, such that given that an end-point 102 has a specific value of a first attribute, there is a high chance that it has a specific value of a second attribute. For example, a correlation may be found between the IP address of end-points 102 and the gateways they use. A correlation may be found between response time of an application and the number of large files stored on the computer. A correlation may be found between having three specific applications installed on a computer and not having a fourth application stored thereon and/or having a higher than average connection utilization. These examples are brought here for illustration purposes and many more groupings and/or correlations may be found.

In some embodiments of the invention, the correlations include finding linear or other function matching between two or more attributes. For example, it may be found that the available memory on the network computers decreases with the number of times the computers utilize a specific application.

The grouping (204) is optionally directed at finding correlations between cause attributes, so that when a problem is identified, fast identification of the cause is possible. Alternatively or additionally, the grouping (204) relates to all the attributes, even those that have relatively few end-points for which attribute values are available. It is noted that the task of grouping is generally computationally intensive. Therefore, in some embodiments of the invention, as indicated in FIG. 2, the grouping (204) is performed continuously without relation to detection of a problem, in order to reduce the processing time required between identifying a problem and suggesting possible causes. In other embodiments of the invention, the grouping (204) is performed only after a problem is identified in order to have the grouping (204) focus on the problem.

Referring in more detail to controller 125 instructing (206) agents 130 on the policies they are to implement, in some embodiments of the invention, the access permissions of some of the end-points 102 are adjusted according to the groupings. For example, if it is determined that more than a predetermined number of end-points 102 have more than a given number of attribute values possibly indicative of a security breach, the strictness level of the firewall and/or of the policies of one or more switches or routers may be increased.

In other embodiments of the invention, the instructing (206) of policies to be implemented includes instructions on resource allocations to end-points of the network. For example, if the number of end-points 102 having a long response time from a database server exceeds a predetermined threshold, the allocation of the access to the database server may be changed to prevent certain end-points from taking too large a share of the processing resources of the database server.

Alternatively or additionally to adjusting the policies according to the grouping results, the policies are adjusted according to the values of one or more pre-selected attributes in one or more of the end-points 102. For example, if at least a predetermined number of end-points are undergoing a large number of intrusion attacks, the strictness level of the firewall and/or of the policies of one or more switches or routers may be increased.

The access permissions and/or resource allocations are adjusted, in some embodiments of the invention, according to information from other network elements than those whose permissions are affected. Optionally, controller 125 limits the number of end-points 102 allowed to perform specific acts within a predetermined period, for example in order to prevent a large number of end-points from failing concurrently. In an exemplary embodiment of the invention, after a predetermined number of end-points 102 update a software version, controller 125 instructs the agents 130 of all the other end-points 102 to prevent updating of the software for a predetermined time in which any errors due to the update are expected to appear.

In some embodiments of the invention, the policies are also adjusted according to attributes of the end-points being adjusted. For example, end-points 102 having a low bandwidth connection to the network may be provided lower priority on a database that provides large amounts of data. In an exemplary embodiment of the invention, an end-point connected from home is not allowed to use printers that are highly loaded or is not allowed to use printers at all. Alternatively, jobs of users at home are given a different (e.g., low) priority. Alternatively or additionally, for security reasons, users are not allowed to use certain applications unless they are located within a specific physical location or using a specific computer. In some embodiments of the invention, the maximal size of files that an end-point is allowed to transfer is set according to the bandwidth of the connection of the end-point to the network. Alternatively or additionally, end-points having a low quality connection are not allowed to access databases that are sensitive to errors which may affect their updating.

In an exemplary embodiment of the invention, controller 125 does not allow end-points 102 to access the network and/or specific applications of the network, unless they have installed on them a required set of software, e.g., anti-virus software. In some embodiments of the invention, some or all of end-points 102 are not allowed to access a specific group of servers or computers (e.g., finance department computers), unless an anti-spy-ware program is installed on the end-points 102 and/or the end-points 102 use a suitable encryption algorithm to communicate.

In some embodiments of the invention, controller 125 verifies the information it receives from agents 130 by comparing information received from neighboring end-points 102 and/or by comparing to information received from network devices. Although more complex, in accordance with these embodiments it is much harder for users to fiddle with the information provided to controller 125 in order to receive permissions they do not deserve.

In response to displaying (208) the groupings on console 128, a system manager can optionally set, through console 128, policies of one or more groups of end-points 102 together, based on the determination of the groups. For example, the system manager can easily set the policies of end-points that have installed on them two specific applications. In some embodiments of the invention, console 128 displays to the system manager all groupings having at least a predetermined importance level (e.g., correlating a large number of attribute values) and allowing the system manager to indicate their importance for later occasions and/or to define policies for those groups.

Referring in more detail to monitoring (210) the number of end-points having an attribute value indicative of a problem, in some embodiments of the invention, the threshold number of end-points having the problem which requires action (e.g., finding cause attributes and/or policy enforcement) is set as a compromise between having many false alarms and missing solvable problems. Optionally, the predetermined threshold has the same value for all types of problems, for simplicity. Alternatively, for each problem attribute, a different threshold is set, for example, according to the severity of the problem.

Referring in more detail to determining (212) significant attribute values common to the end-points 102 suffering from the problem, in some embodiments of the invention, the determination is performed as a continuation of the grouping process. In some embodiments of the invention, controller 125 compares the list of network elements on which the identified problem exists, with the grouping information, in order to determine possible causes of the problem. The determination (212) optionally includes finding groups of attribute values that appear together only in end-points 102 having the problem and/or appearing with a high probability in end-points 102 having the problem.

In some embodiments of the invention, the determination (212) of significant attribute values includes finding one or more reference groups having similar attributes but not suffering from the problem.

In some embodiments of the invention, a sub-group of end-points 102 suffering from the problem is selected and correlations are determined for the sub-group. The correlations determined for the sub-group are then verified against the attributes of the end-points 102 not included in the sub-group. In some cases the use of a sub-group reduces the complexity of the grouping to a manageable complexity. The members of the sub-group are optionally selected randomly. Alternatively, the members of the sub-group are selected as those end-points 102 for which most complete information is available. Further alternatively or additionally, the members of the sub-group are selected as end-points 102 having various attribute values that are representative of the group of end-points 102 suffering from the problem.

In an exemplary embodiment of the invention, the sub-group includes between 5-15 end-points, although any other number of end-points may be included in the sub-group.

The problem attributes optionally include malfunctioning of applications, such as software applications that do not start up or that freeze, specific application commands that do not operate and/or unreachable servers. Alternatively or additionally, the problem attributes include applications that have long response times (e.g., relative to other end-points and/or relative to previous operation on the same end-point), lack of virtual memory and/or disk-space, high processing utilization rates, high percentages of transmission errors and/or slow communication. In some embodiments of the invention, the problem attributes include the rate of occurrence of application and/or system crashes.

The group of attributes which may be correlated to a problem include substantially any attribute monitored by agents 130, as even if the correlated group of attributes is not the cause it may lead to the cause, for example having the same cause as the problem. A problem may be correlated, for example, with running two or more clashing applications at the same time and/or running a specific version of an application on an end-point having specific hardware attributes. Other exemplary problem causes may be configuration of an incorrect gateway address, lack of sufficient memory required by an application, not having a sub-application required for correct operation of an application or low disk space. As is known in the art, problem causes may be unexpected combinations of attributes which separately taken would not be considered suspicious with relation to the problem. Finding that exactly the ten (e.g., out of a thousand) end-points suffering from a problem have a rare combination of five attributes (e.g., hardware module, operating system version, use of a specific application, network connection type, concurrent use of three specific applications) may speed up the identification of the problem and its solution. Knowing the combination of attributes that causes a problem may make it possible to avoid the problem even if the cause is not understood by simply not allowing all of the attributes to have the offending values at the same time. Optionally, as an immediate measure, controller 125 automatically instructs the agents 130 of end-points 102 affected by the problem to change the value of at least one of the attributes, until a complete solution is found by a human system manager. Alternatively or additionally, agents 130 of end-points 102 not affected by the problem are instructed to prevent, at least temporarily, reaching a state in which all the attribute values associated with the problem are reached.

Referring in more detail to instructing (214) end-points 102 suffering from the problem on policies they are to carry out, in some embodiments of the invention, upon detecting a reoccurring problem, controller 125 instructs the agents 130 on the end-points 102 having the problem to collect more information to be used in determining the cause of the problem. Alternatively or additionally, controller 125 instructs the agents 130 to notify the users that the problem is being handled. Further alternatively or additionally, controller 126 displays a description of the problem on console 128 and requests instructions from the system manager. The system manager optionally provides instructions to be carried out by the agents 130 on which the problem was identified.

In some embodiments of the invention, controller 125 automatically generates instructions to the agents 130 of the end-points having the problem responsive to the attribute values in common to the end-points having the problem, taking into account the attribute values of reference groups. Optionally, controller 125 is configured with a table of attribute value groups and policy instructions to be performed when a problem associated with the attribute value group is identified. The table is optionally configured based on previously solved problems in the same network or in other networks.

In an exemplary embodiment of the invention, when the end-points 102 having a problem are determined to uniquely (or at a high probability) have specific versions of two applications, controller 125 automatically instructs the agents 130 of the end-points to install a different version of at least one of the applications. Optionally, controller 125 determines whether a more updated version exists for one or more of the applications. Alternatively or additionally, controller 125 determines a version that is used by end-points that do not suffer from the problem (although using both applications) or otherwise have a high operation quality level.

In another exemplary embodiment of the invention, when communication to specific applications is not available to a group of end-points 102, and the end-points having the problem are determined to all be configured to operate through a specific gateway, the end-points are automatically instructed to switch to using a different gateway.

In another exemplary embodiment of the invention, when a software application is causing problems (i.e., the software has a high correlation with problems), controller 125 instructs the affected end-points 102 to install a software patch that prevents the problem from appearing. Alternatively or additionally, controller 125 instructs agents 130 of affected end-points 102 to prevent use of problematic software applications and/or to uninstall the problematic software.

The automatically applied and/or system manager manually provided corrective instructions are optionally provided to all the end-points 102 having the problem, at once. Alternatively, for example when the corrective instructions are not sure to solve the problem, the corrective instructions are provided only to a limited group of end-points 102. If the problem is solved in the limited group of end-points 102, the corrective instructions are provided to the other end-points suffering from the problem. In some embodiments of the invention, several different corrective instructions are tested on different groups of end-points 102 in parallel. Optionally, the analysis of the cause of the problem continues even after the instructions were provided, for example when the instructions did not solve the problem. The additional information due to the negative results of the corrective instructions may aid in finding the solution.

Referring in more detail to instructing (216) end-points 102 not suffering from the problem on policies they are to carry out, in some embodiments of the invention, end-points 102 are instructed to install corrective software patches or to prevent installation of problematic software patches. In an exemplary embodiment of the invention, when due to a problem a group of end-points 102 having the problem are instructed to use a different server or gateway than was causing the problem, other end-points 102 that do not have the characteristics of the problem are instructed to use the server or gateway that was involved in causing the problem, in order to balance the load in the network.

In some embodiments of the invention, controller 125 operates in conjunction with a help desk system (not shown). Optionally, information from the help desk system, for example problem reports from users of end-points 102, are converted into attribute values taken into consideration in the grouping (204) and/or determining (212) of the attributes of end-points having problems. For example, a group of end-points whose owners complain on slow response may be compared to the actual measured response times.

Optionally, when a problem is reported to the help desk, controller 125 is instructed (automatically or by a human operator) to search for other end-points having the same problem. Alternatively or additionally, controller 125 searches for attributes of the uniqueness of the end-point 102 having the problem, e.g., identifies groups of attribute values common to the end-point problem and only several other end-points. The uniqueness attributes are optionally used to search for additional end-points that may have the problem. Alternatively or additionally, the uniqueness attributes are displayed to a system manager searching for the cause of the problem. Problems identified by controller 125 are notified, in some embodiments of the invention, directly to the help desk. Optionally, in these embodiments, the help desk is connected to console 128.

Agent

In some embodiments of the invention, agent 130 imposes policies on the end-point 102 on which it operates, even when end-point 102 is not connected to network 100 and cannot communicate with controller 125. Additionally, agent 130 optionally continuously monitors the attributes of end-point 102, even when the end-point 102 is not connected to the network. When the connection to the network is reestablished, agent 130 passes the information it accumulated to aggregator 122. In some embodiments of the invention, when agent 130 receives a data collecting instruction, it does not necessarily respond immediately. Rather, it may respond according to instructions on when it is to respond, for example when its buffer is full or when a significant event occurs.

Agents 130 are optionally installed on end-points 102 by a human system manager. Alternatively, when policy controller 125 identifies an end-point 102 that does not have an agent installed thereon, policy controller 125 determines whether an agent should be installed on the end-point 102 and if required performs automatic or semi-automatic installation of the agent on the end-point 102. The installation is optionally performed using existing configuration management tools, such as Windows Management Instrumentation (WMI). The determination of whether to install agent 130 on the end-point 102 is optionally performed by asking a system manager through console 128 and/or by requesting a password or other code from the end-point 102.

Agent 130 is optionally planned to be universally installable between different end-points 102, for example having different operating systems (e.g., Windows, Linux) and/or different hardware. Agent 130 is optionally planned to have a small memory and/or storage footprint and/or a minimal processing overhead so as to have a minimal and predictable impact on a user of end-point 102.

Agents 130 may be developed by a same vendor of controller 125 or, alternatively, controller 125 may be designed to operate with legacy agents, such as the Windows management instrumentation (WMI) agent. If necessary, such legacy agents may be upgraded to operate with controller 125 and/or to add functionalities in accordance with the present invention. In some embodiments of the invention, different end-points 102 carry different types of agents. For example, some end-points 102 may carry agents that only perform monitoring, while other end-points 102 carry agents that perform both monitoring and enforcement. Alternatively or additionally, network devices include agents that only perform monitoring, while end-points have agents that perform enforcement and optionally also monitoring.

In some embodiments of the invention, agents 130 comprise software capsules that actively prevent altering and/or other unwarranted access to the capsule, for example as described in U.S. patent publications 2002/0116632 to Itoh et al., 2003/0221121 to Chow et al., or 2002/00199100 to Nenashev, the disclosures of which are incorporated herein by reference.

In an exemplary embodiment of the invention, agent 130 comprises a plurality of software layers, at least one of which is protected, for example using protection code in kernel hooks and/or by being located in a read only BIOS area. The protected layer optionally has a very small footprint and/or has limited interfaces with the system, in order to simplify its protection. Optionally, the protected layer includes substantially only a loader of the other layers, which loads the other layers in a secure, certificate-authenticated manner. The kernel hooks optionally prevent debugger software from attaching to agent 130.

Agent 130 optionally does not install itself on end-points 102 that have a kernel debugger installed thereon. Once agent 130 is installed it optionally prevents installing kernel debuggers on its end-point 102. Thus, kernel debuggers cannot be used to compromise the integrity of agent 130. Similar measures are optionally used for any other software which may be used to compromise the integrity of agent 130. Agent 130 optionally monitors the software on end-point 102 to identify and disable DLL injectors that attempt to inject software portions into portions of agent 130.

Agent 130 optionally checks instructions it receives from controller 125 for a security certificate that the agent stores in the protected layer. In some embodiments of the invention, agent 130 signs external files that it uses with a cryptographic signature (e.g., PKI, MD5) and verifies that the signature is correct each time it accesses the file, so as to prevent unauthorized changing of the external files.

The number of aggregators 122 is optionally scaleable according to the needs of the network, for example according to the number of end-points 102 in the network. In some embodiments of the invention, when the number of aggregators 122 is relatively large, one or more of the aggregators may be assigned as a super-aggregator that combines the data from at least some of the other aggregators and thus reduces the load on controller 125. The super-aggregator may communicate only with aggregators 122 and controller 125 or may be in charge of some of end-points 102. In large networks, a hierarchy of three, four or even more levels of aggregators may be used.

In some embodiments of the invention, aggregators 122 use an in-memory database, while controller 125 uses a back-end database. Optionally, the information from agents 130 is stored and managed using standard database software, such as MySQL or Oracle, although any other storage methods may be used.

Although in the above description aggregators 122 and policy controller 125 are shown as being different entities, in some embodiments of the invention the tasks of aggregators 122 may be carried out by controller 125. Similarly, console 128 may be separate from controller 125 or may reside on a same computer. In some embodiments of the invention, some of the tasks of policy controller 125 are performed by aggregator 122.

In some embodiments of the invention, at least one of aggregators 122 serves as a backup for controller 125. Alternatively, a separate backup controller is used to backup for controller 125 in case of failure.

Although the above description relates to putting agents 130 on end-points 102, in some embodiments of the invention, agents 130 are also installed on network devices of network 100. In addition, agents 130 and policy controller 125 may perform various policy tasks in addition to those described above, such as validating end-points.

In order to perform their tasks, aggregators 122 and controller 125 optionally include a processor, memory and communication interfaces which perform the tasks described herein as being performed by controller 125 or aggregator 122.

Communication between agents 130, aggregators 122 and controller 125 are optionally encrypted and/or forge-protected in order to prevent tampering with the operation of controller 125. Although substantially any encryption method may be used in accordance with the present invention, following is the description of one particular exemplary method which may be used.

Encrypted Communication Method

Each of some or all of the network elements is configured with a code vector formed of a plurality of code portions. The code vector is optionally the same for all the network elements. In addition, each of some or all of the network elements is configured with a separate unique code keyID. In some embodiments of the invention, each of some or all of the network elements is configured with a list of functions $h_i(\ )$ for use in transferring data between controller 125 and the network elements, as described below. Functions $h_i(\ )$ are optionally reversible so that the transferred data can be extracted by using the reverse function. Optionally, in transferring data, the controller selects one of the functions and/or one of the vector portions arbitrarily, so as to reduce the chances that an eavesdropper will be able to guess the code portion and/or the function. The controller then notifies the network element with which it communicates on the index of the vector portion it selected for the transmission.

In an exemplary embodiment of the invention, each element is configured with a sufficient number of code portions and/or functions, so that determination of the code vector and/or the functions from listening to the network is very difficult. Optionally, the number of functions and/or code portions used are limited according to the resources of the network elements. In an exemplary embodiment of the invention, each network element is configured with 64 functions and the code vector includes 128 code portions. Optionally, the functions h( ) are relatively simple functions, for example based on logical operations (e.g., and, or) that do not require substantial amounts of processing resources. In accordance with the present invention, high protection levels are achieved, without using complex encryption functions that are processing power intensive.

In some embodiments of the invention, all network elements are configured with the same list of functions $h_i(\ )$. Alternatively, each network element is configured with a different list of functions or each group of network elements is configured with a separate list of functions. For example, each type of network device (e.g., printers, servers) may be configured with a separate list of functions. Alternatively, randomly selected groups may be configured with different lists of functions, in order to make unwarranted determination of the functions harder. Controller 125 is configured with the code vector, the function lists and the unique code of each network element.

Figure 3:
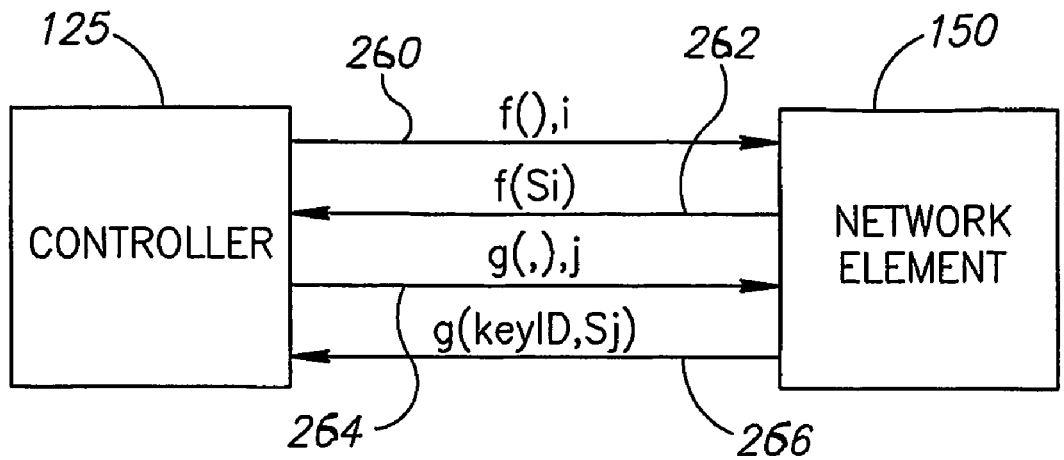
FIG. 3 is a schematic illustration of data exchanged in authenticating a network element, in accordance with an exemplary embodiment of the invention.

FIG. 3 is a schematic illustration of data exchanged in authenticating a network element 150 (e.g., end-point 102, server 110) by controller 125, in accordance with an exemplary embodiment of the invention. When required to authenticate the identity of a network element, controller 125 optionally transmits (260) to the network element an index i of a portion of code vector $S_i$ to be used and a function to be applied to the code vector portion $S_i$. The network element transmits (262) back to controller 125 the result $f(S_i)$ of applying the function f( ) to $S_i$. Controller 125 verifies that the result $f(S_i)$ returned from the network element is correct. In some embodiments of the invention, controller 125 additionally transmits (264) to the network element a function g(,) and index j. The network element applies function g(,) to its unique code keyID and to the portion j of the common code vector S. The result g(keyID, $S_j$) is returned (266) to controller 125, which verifies the correctness of the result.

Transmitting the function f( ) to the network element, rather than using a function already stored in the network element, prevents the possibility of pre-configuring a network element, which does not have the code vector, with the result of applying preconfigured functions on code portions, for example as determined from listening to traffic on the network.

A computer not configured with the vector code S cannot return the correct results as it does not have vector S. It is noted that S cannot be determined from listening to the network, since $S_{i,j}$ are not transmitted on the network. Optionally, functions f( ) and/or g(,) do not allow simple reverse determination of $S_{i,j}$, from the results transmitted on the network. In some embodiments of the invention, functions f( ) and/or g(,) do not allow determination of $S_{i,j}$ at all, for example due to the functions generating the same value for a plurality of different possible values Si. Alternatively or additionally, functions f( ) and/or g(,) are not transmitted to the network element. Instead, each network element is configured with a list of functions $\{f_k\}$ and/or g(,) and controller 125 transmits (260) to the network element an index k of the function to be used.

Alternatively to transmitting functions f( ) and g(,) separately to the network element, the functions are transmitted to the network element together in a single message. Optionally, in this alternative, the network element responds with both results in the same message. The authenticating method of FIG. 3 is optionally performed periodically. In some embodiments of the invention, the authentication is separately performed with each participating network element. Alternatively or additionally, controller 125 periodically transmits a multicast or broadcast authenticating message requesting that all the network elements respond. Optionally, the network elements respond at random intervals, in order to distribute the load of the responses. According to the responses, controller 125 optionally generates periodic reports of the network elements currently connected to the network. Alternatively or additionally, authentication is performed whenever it is desired to transmit commands and/or information to a network element and/or to receive information from a network element.

Computers and/or other processors connected to the network that do not have the configured code of the network will not be able to be authenticated by network server 125. As described below, in some embodiments of the invention, the access to network devices, including switches and/or routers, requires receiving an access key from controller 125. Therefore, the computers and/or other processors that do not belong to the network will not be able to communicate with other elements of the network.

Figure 4:
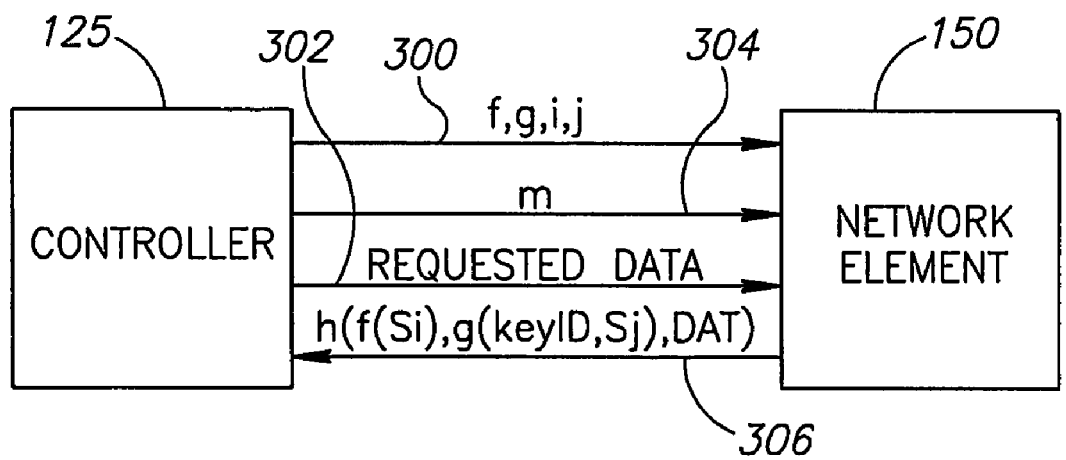
FIG. 4 is a schematic illustration of collecting data from a network element, in accordance with an exemplary embodiment of the invention.

FIG. 4 is a schematic illustration of the flow of communication utilized in collecting data from a network element 150 by controller 125, in accordance with an exemplary embodiment of the invention. Controller 125 optionally instructs (300) the network element to calculate $f(S_i)$ for a given i, and g(keyID, $S_j$) for a given j, as described above with reference to FIG. 3. In addition, controller 125 transmits (302) to network element 150 an indication "m" of a prestored function "h" to be used in encoding the collected data. Optionally, controller 125 further provides (304) an indication of the data requested by controller 125. Alternatively, only a single type of data is collected (for example, a vector including all the data possibly of interest), so that an indication of the type of data is not required.

Network element 150 responds (306) with h{h($S_i$), g(keyID, $S_j$), DAT}, wherein DAT is the requested data. Controller 125 then extracts the data DAT by reversing the operation of function h.

In an exemplary embodiment of the invention, the collected data DAT includes a status vector of network element 150 and its surroundings. Optionally, the status vector states the connection bandwidth and/or quality of each connection to network element 150. Alternatively or additionally, the status vector states the amount of data transmitted/received on the connections of network element 150. Further alternatively or additionally, the status vector states the applications, servers and/or other network elements that recently communicated with the network element 150.

In some embodiments of the invention, the collected data includes the network location of the end-points 102 or of all the network elements. Optionally, each end-point 102 determines the IP address and/or other identity information of its adjacent routers and provides the IP address as the location information. In some embodiments of the invention, routers and/or switches of the network report their neighboring end-points 102 and the data is compared to verify correctness. Alternatively, for simplicity, location information of end-points 102 is provided only by the routers and/or switches of the network. According to the location information received from the network elements, controller 125 optionally generates and/or updates a map of the network.

Figure 5:
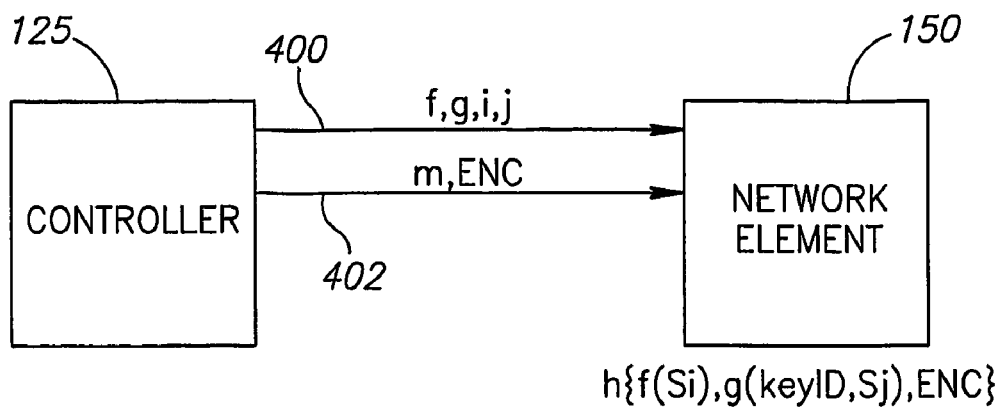
FIG. 5 is a schematic illustration of transmitting data from a controller to a network element, in accordance with an exemplary embodiment of the invention.

FIG. 5 is a schematic illustration of transmitting data from controller 125 to a network element 150, in accordance with an exemplary embodiment of the invention. Controller 125 optionally instructs (400) the network element to calculate $f(S_i)$ for a given i, and g(keyID, $S_j$) for a given j, as described above with reference to FIG. 3. In addition, controller 125 transmits (402) to the network element an encoded form (ENC) of the transmitted data and an indication m of a function h to be applied to the encoded transmitted data (ENC) and to $f(S_i)$ and g(keyID, $S_j$) in order to extract the transmitted data h{f($S_i$), g(keyID, $S_j$), ENC}. Using this method, a network element not belonging to the network (i.e., not having the configured code vector S), or not having the unique keyID of the destination, will not be able to decipher the transmitted data.

Optionally, in this embodiment, $f(S_i)$ and g(keyID, $S_j$) are not transmitted separately, so that it is harder for an eavesdropper to determine the transmitted data. Alternatively, the data transmission is performed following an authentication procedure as described with reference to FIG. 3, and in order to minimize the load on network 100, $f(S_i)$ and $g(keyID, S_j)$ from the authentication procedure are used in the data transmission.

In some embodiments of the invention, controller 125 selects the indices i, j and/or the function h( ) so that it is possible to use the result of function h( ) for data transfer. Alternatively, ENC is sufficiently large, so that any desired data can be encoded with substantially any code portions and/or function h( ).

In an exemplary embodiment of the invention, the transmitted data comprises an access vector provided to an end-point 102. For example, the access vector may include a bit for each network device of network 100. A bit which is set indicates that the end-point 102 may access the device corresponding to the set bit. Alternatively or additionally, one or more devices are represented by a plurality of bits, which indicate, for example, the priority of the end-point in accessing the respective device. In some embodiments of the invention, in determining the access vector, network element 150 performs a logical operation between the resultant value $h\{f(S_i), g(keyID, S_j), ENC\}$ and a locally determined access vector, which indicates devices not to be accessed or to be given low priority due to preferences of network element 150 and/or environmental conditions. The environmental conditions optionally include a determination of whether the end-point 102 is within the network or outside the network, as determined, for example, according to whether its packets pass through a firewall and/or an external port of the network. Alternatively or additionally, the environmental conditions include the speed and/or bandwidth of the connection of end-point 102 with the network and/or the quality of the connection as indicated by the percentage of lost packets, the BER and/or any other suitable quality measure.

Optionally, each end-point 102 manages an access vector which states the permissions for the end-point to access each of the network devices. Optionally, the access vector is updated each time an access vector update message is received from controller 125 and/or each time the environmental conditions change.

In another exemplary embodiment of the invention, the transmitted data comprises access allowance instructions provided to a network device (e.g., a server 110). Optionally, in accordance with this exemplary embodiment, the transmitted data includes an identification number of an end-point 102 and a respective access priority of the end-point. In some embodiments of the invention, the transmitted data includes a list of end-point identification numbers and respective access priorities. Optionally, in addition to the access priority, the transmitted data includes for each end-point 102 an access code which is to be provided by the end-point when it approaches the network device for service.

Figure 6:
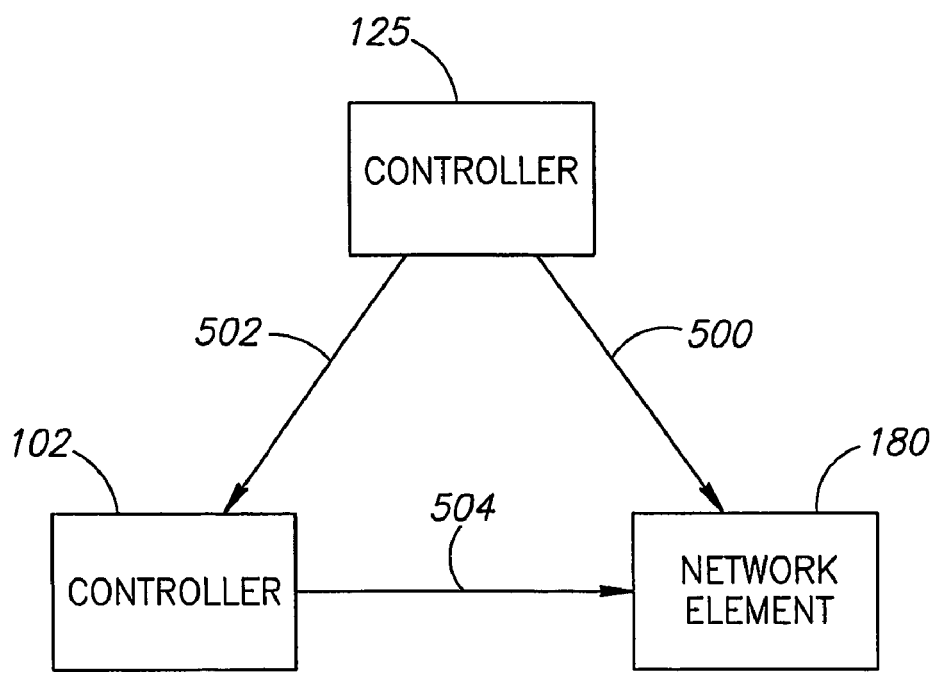
FIG. 6 is a schematic illustration of a procedure of requesting service from a network device, in accordance with an exemplary embodiment of the invention.

FIG. 6 is a schematic illustration of a procedure of requesting service from a network device 180, in accordance with an exemplary embodiment of the invention. As described above with reference to FIG. 5, controller 125 transmits (500) to network device 180 a list that states, for each end-point 102, an access code to be received from the end-point. Optionally, controller 125 also transmits (502) to end-point 102 the access code it is to provide to network device 180. Thereafter, end-point 102 transmits (504) a service request including its identification and the access code to network device 180. Using this method prevents end-points 102 from receiving service from network devices 180, without registering first with controller 125.

In some embodiments of the invention, the access code is determined separately, for each service request, such that end-points 102 cannot use old access codes and/or access codes assigned to other network elements. Alternatively or additionally, the access codes are changed periodically. Optionally, the access codes are changed even when a connection is in progress, in which case, the end-point 102 needs to transmit the new access code to the network device within a predetermined time in order to prevent the connection from shutting down. Alternatively, changes in the access codes only affect new connections.

In some embodiments of the invention, the access code is provided at the beginning of each connection in a connection establishment stage. Alternatively or additionally, the access code is provided in each packet of the connection, in a field designated therefore.

The transmission (500) to network device 180 of the access codes and priorities of the end-points 102 is optionally performed without relation to requests of end-points 102 for service. In some embodiments of the invention, the transmission (500) of access codes and priorities is performed periodically, for example every 10-20 minutes, although any other longer or shorter periods may be used. Alternatively or additionally, the transmission (500) of access codes and/or priorities is performed whenever there is a change in the priorities and/or access rights of an end-point 102. Optionally, the transmission (502) of access codes to end-points 102 is also performed without relation to requests for service.

As mentioned above, in some embodiments of the invention, the access codes are generated and/or transmitted responsive to a request for service of end-point 102. Optionally, end-point 102 transmits the request for service directly to controller 125. Responsive to the request, controller 125 provides end-point 102 with an access code. End-point 102 then uses the access code to directly approach network device 180. In some embodiments of the invention, controller 125 generates the access code responsive to the request of end-point 102. Alternatively, controller 125 provides end-point 102, responsive to the request, a pre-generated code, optionally a code already transmitted to network device 180.

Alternatively to transmitting the request to controller 125, the request is transmitted directly to network device 180. Network device 180 forwards the request to controller 125 which provides the access codes to end-point 102 and if necessary to network device 180. Optionally, along with the request, network device 180 notifies controller 125 whether it requires an access code.

Alternatively to transmitting the code itself from end-point 102 to network device 180, the end-point transmits instructions to be performed on the configured code in order to extract the code. Thus, the code can be used for a longer period as it is not exposed on the network.

In some embodiments of the invention, some or all of the routers and/or switches of network 100 are controlled in accordance with the method of FIG. 6. These routers and/or servers examine each packet passing through them for security. Optionally, packets belonging to an existing session are forwarded by the router if their session was registered by the router. New sessions are optionally established only if an ID as required by controller 125 is provided. Alternatively or additionally, all the packets of the session are required to carry the ID required by controller 125. In some embodiments of the invention, packets directed to specific ports that do not involve a security hazard, such as non-hazardous packets (for example, packets known to have passed through a firewall) directed to e-mail ports, are allowed to pass even if they are from computers not belonging to the network, so that communication with the external world is not prevented.

Computers not belonging to the network will not be able to communicate through the network. Even if a computer is connected to a LAN or other connection within the network, the computer will not be able to communicate with any other elements of the network. The routers optionally additionally make logs of the packets that do not carry the required codes, so that a human operator will be able to track attempts to penetrate and/or attack the network, and/or to identify computers that are illegitimately connected to the network.

In the above description, each network element is configured with both codes and functions. It is noted, however, that the invention may be implemented, although with less security, without configuring the network elements with lists of functions. Instead, controller 125 may transmit the functions used to the network elements each time a function is to be used. Alternatively, the network elements may be configured with sets of functions, and the numbers to which the selected functions are applied are transmitted to the network elements by controller 125.

In some embodiments of the invention, in addition to the protection provided using preconfigured data, passwords are required so that an unauthorized user of a computer belonging to the network will have to overcome the password barrier. Optionally, the permissions allowed to a user depend on both the user login and the computer used. For example, a user logging in from a computer which is not the regular computer of the user may be limited to specific simple tasks. Similarly, a computer may be allocated different priorities according to the login of the human user of the computer.

It will be appreciated that the above-described methods may be varied in many ways, including, changing the order of steps, and/or performing a plurality of steps concurrently. For example, data described as being transmitted in different acts may be transmitted together in a single packet and data described as being transmitted in a single act may be transmitted in a plurality of packets. It should also be appreciated that the above described description of methods and apparatus are to be interpreted as including apparatus for carrying out the methods, and methods of using the apparatus.

The present invention has been described using non-limiting detailed descriptions of embodiments thereof that are provided by way of example and are not intended to limit the scope of the invention. It should be understood that features and/or steps described with respect to one embodiment may be used with other embodiments and that not all embodiments of the invention have all of the features and/or steps shown in a particular figure or described with respect to one of the embodiments. Variations of embodiments described will occur to persons of the art. Furthermore, the terms "comprise," "include," "have" and their conjugates, shall mean, when used in the claims, "including but not necessarily limited to."

It is noted that some of the above described embodiments may describe the best mode contemplated by the inventors and therefore may include structure, acts or details of structures and acts that may not be essential to the invention and which are described as examples. Structure and acts described herein are replaceable by equivalents which perform the same function, even if the structure or acts are different, as known in the art. Therefore, the scope of the invention is limited only by the elements and limitations as used in the claims.

The invention claimed is:

1. A method for controlling a network, said network comprising:
    a first set of two or more network elements and a second set of one or more network elements,
    wherein each network element of said first set and said second set comprises an end point element of said network which hosts an agent;
  a policy controller; and
  an aggregator connected to said policy controller;
said method comprising:
  collecting real-time operational information relating to attribute values at two or more agents from said first set of two or more network elements which host said agents;
  transmitting, by said two or more agents, said operational information to said aggregator;
  processing, by said aggregator, said operational information,
  wherein said processing comprises determining and forming two or more groups of network elements, each group including at least one network element from said first set of network elements;
  receiving said real-time operational information relating to said attribute values and results of said processing by said aggregator at said policy controller from said aggregator;
  selecting a policy by said policy controller, without human intervention, based on said real time information relating to said attribute values and said results of said processing by said aggregator, to be implemented by a selected group of said groups of network elements; and
  enforcing said selected policy on said at least one of said second set of network elements through said agent hosted thereby,
  wherein said at least one of said second set of network elements is included in the selected group of network elements, and
  wherein said enforcing comprises:
    repeatedly collecting, by each agent hosted by said selected group of network elements, updated real-time operational information relating to the attribute values,
    receiving, by said policy controller, the updated real-time operational information relating to the attribute values,
    transmitting, to each agent hosted by said selected group of network elements in said second set, instructions for performing the enforcement of said selected policy, and
    executing, by said agents, hosted by said selected group of network elements in said second set, said instructions for performing the enforcement of said selected policy.

2. A method according to claim 1, wherein collecting real-time operational information comprises collecting information on operational problems.

3. A method according to claim 2, wherein collecting real-time operational information comprises collecting information on applications that do not operate or operate slowly.

4. A method according to claim 2, wherein collecting real-time operational information comprises collecting information on system or application crashes.

5. A method according to claim 1, wherein collecting real-time operational information comprises collecting information on software applications installed or running on the network elements.

6. A method according to claim 1, wherein collecting real-time operational information comprises collecting information on the communications between elements of the network.

7. A method according to claim 1, wherein selecting the policy to be implemented comprises selecting a policy relating to a software to be installed on the second network element.

8. A method according to claim 1, wherein selecting the policy to be implemented comprises selecting a policy relating to a software to be uninstalled from the second network element.

9. A method according to claim 1, wherein selecting the policy to be implemented comprises selecting a policy relating to preventing installation of a software on the second network element.

10. A method according to claim 1, wherein selecting the policy to be implemented comprises selecting responsive to a determination that a group of network elements having a common problem have installed thereon a specific software application or combination of software applications.

11. A method according to claim 1, wherein selecting the policy to be implemented comprises selecting a policy which allocates network resources.

12. A method according to claim 1, wherein the policy is, elected implemented within less than 60 minutes from the collecting of the information.

13. A method according to claim 1, wherein collecting the operational information is performed repeatedly.

14. A method as defined in claim 1 in which an aggregator is connected to said policy controller; said method in which:
said receiving said real-time operational information relating to said attribute values is done at said aggregator and/or said policy controller.

15. A method according to claim 1, wherein the policy controller is adapted to maintain for at least one network element, a plurality of snapshot records of said real-time operational information to have a record of changes in said operational information for use in selecting said policy.

16. A system according to claim 1, wherein the policy controller is adapted to verify that each network element belongs to the network before collecting information from the network element.

17. A system for controlling a network, said network comprising:
a first set of two or more network elements and a second set of one or more network elements, each network element of said first set of network elements and second set of network elements comprising a processor, memory, and a communication interface,
wherein each network element of said first set and said second set comprises an end point element of said network which hosts an agent;
wherein said agents hosted by said first set of two or more network elements are configured to collect real-time operational information relating to attribute values;
wherein each of said agents hosted by said first set of two or more network elements and by said second set of one or more network elements are configured to enforce a selected policy, said enforcing comprising:
repeatedly collecting, by each of said agents, updated real-time operational information relating to the attribute values,
receiving instructions for performing the enforcement of a selected policy, and
executing said instructions for performing the enforcement of said selected policy;
an aggregator, wherein the aggregator is configured to process operational information received from said agents hosted by said first set of two or more network elements,
wherein said processing comprises determining and forming two or more groups of network elements, each group including at least one network element from said first set of network elements; and
a policy controller,
wherein said policy controller is configured to:
receive said real-time operational information and the results of said processing by said aggregator,
select said selected policy, without human intervention, based on said real time information relating to said attribute values and said results of said processing by said aggregator, to be implemented by a selected group of said groups of network elements,
receive from each agent hosted by the network elements included in said selected group the updated real-time operational information relating to the attribute values,
transmit, to each agent hosted by said selected group of network elements in said second set, said instructions for performing the enforcement of said selected policy.

18. A system according to claim 17, wherein the policy controller is adapted to find, for a group of network elements having a problem, a combination of attribute values that correlate with the problem to at least a predetermined degree.

19. A system according to claim 17, wherein the policy controller is adapted to find, for a group of network elements having a problem, a combination of attribute values that appears only on the network elements having the problem.

20. A system according to claim 17, wherein the policy controller is adapted to collect for at least one network element, a plurality of snapshot records of the network element at different times.

21. A system according to claim 17, wherein the policy controller is adapted to verify that each network element belongs to the network before collecting information from the network element.

22. A system according to claim 17, wherein the processor is adapted to find groups using a k-clustering or hierarchy clustering method.

23. A system according to claim 17, wherein the policy controller is adapted to collect for at least one network element, a plurality of snapshot records of the network element at different times.

24. A system as defined in claim 17 in which also includes an aggregator which is connected to said policy controller; which receives said real-time operational information relating to said attribute values as well as or instead of said policy controller.

25. A method according to claim 14, wherein the policy controller and or aggregator is adapted to maintain for at least one network element, a plurality of snapshot records of said real-time operational information to have a record of changes in said operational information for use in selecting said policy.

* * * * *

UNITED STATES PATENT AND TRADEMARK OFFICE
CERTIFICATE OF CORRECTION

PATENT NO.        : 7,788,366 B2
APPLICATION NO.   : 10/567662
DATED             : August 31, 2010
INVENTOR(S)       : Amnon Yacoby et al.

It is certified that error appears in the above-identified patent and that said Letters Patent is hereby corrected as shown below:

Claim 16 line 1 "method" should be substituted for "system".

Signed and Sealed this
Twenty-sixth Day of July, 2011

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,788,366 B2 |
| APPLICATION NO. | : 10/567662 |
| DATED | : August 31, 2010 |
| INVENTOR(S) | : Amnon Yacoby et al. |

Page 1 of 1

It is certified that error appears in the above-identified patent and that said Letters Patent is hereby corrected as shown below:

Column 27, line 36 (Claim 16 line 1) "method" should be substituted for "system".

This certificate supersedes the Certificate of Correction issued July 26, 2011.

Signed and Sealed this
Twenty-third Day of August, 2011

David J. Kappos
*Director of the United States Patent and Trademark Office*